March 14, 1961     F. AKUTOWICZ     2,974,557

EXPANSION NUT ASSEMBLY

Filed July 2, 1959

INVENTOR.
FRANK AKUTOWICZ 2,974,557
Patented Mar. 14, 1961

2,974,557
EXPANSION NUT ASSEMBLY
Frank Akutowicz, 2007 Harvey Road, Wilmington 3, Del.

Filed July 2, 1959, Ser. No. 824,592

6 Claims. (Cl. 85—33)

This invention relates to an improved expansion nut assembly for use in clamps, vises and the like wherein a large preliminary adjustment is made rapidly prior to final tightening. The invention can also be embodied as a positive clutch in machine tools.

Figure 1:
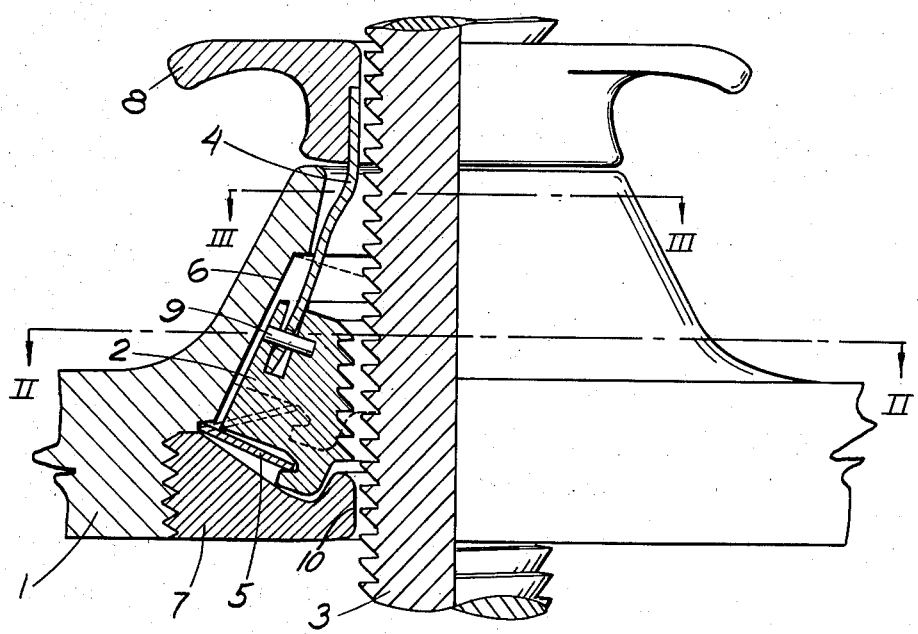
Figure 2:
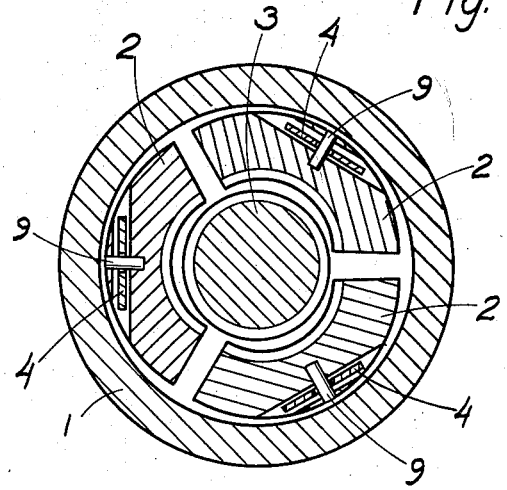
Figure 3:
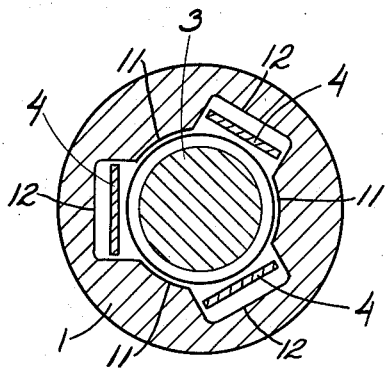

Figure 1 is a longitudinal section showing externally threaded screw 3 passing vertically through internally threaded nut 2. Figures 2 and 3 are cross sections of Figure 1 along the lines II and III respectively. In Figure 1 it is assummed that the load is tending to push screw 3 upward to react against housing 1. Nut 2 is split into 3 sectors as shown in Figure 2. The disengaged position of nut 2 is shown in solid lines in Figure 1. The engaged position in dotted lines. Nut 2, engaging with screw 3, tends to move 3 upward in the unloading direction such that the load does not interfere with the desired engagement. As the load increases, nut 2 is firmly wedged into the conical surface 6 thus preventing the nut from bursting open and releasing the load. Nut 2 is disengaged by first unloading screw 3, then pushing screw 3 downward to cause spring 5 to snap downward and allow spring 4 to open nut 2. With nut 2 open, screw 3 slides easily in guides 10 and 11.

4 is a multiple fingered flat spring one finger of which is allotted to each sector of nut 2 and held by pins 9. Spring 4 tends to open nut 2 towards conical surface 6 of housing 1. The fingers of spring 4 unite and assume an annular cross section just above section III—III of Figure 1. The mushroomed actuating grip 8 is press fitted to this annular section to form, exterior to housing 1, a rigid annular support for the spring 4. Spring 4 passes into housing 1 through enlargements 12 of the interfacial clearance between housing 1 and screw 3. Spring 4 contacting the radial edges of 12 also serves to prevent rotation of nut 2 with respect to housing 1.

The longitudinal position of nut 2 is governed by disc spring 5 shown in equilibrium downward. The other equilibrium position of spring 5 is shown dotted and corresponds to the engaged position of nut 2. The lateral position of the sectors of nut 2 is governed by the taper in 6 being large enough to ensure that nut 2 is completely closed in the distance between the two equilibrium positions of spring 5. The conical outer surface of nut 2 mates under pressure from 5 with conical surface 6, and ensures that the threads of nut 2 have the proper clearance with the threads of screw 3. Suitable grooves for lateral engagement with spring 5 are cut in surface 6 and nut 2. For lateral guidance of disengaged nut 2 the grooves in 2 are cut to provide contact along an entire sectorial circumference. Disengaged nut 2 makes only line contact with surface 6, and rocking of the individual sector about this line of contact can be prevented by circumferential contact of the disc spring with the sector.

Spring 5 is positioned between nut 2 and annular retaining plug 7, which plug also serves to stop excess motion of nut 2 while 2 is still under slight pressure from spring 5. In addition plug 7 also serves as lower guide for screw 3 to prevent the threads of 3 from snagging the disengaged threads of nut 2. The upper guide for 3 is formed in housing 1 by the projecting tongues 11.

I claim:
1. In an improved expansion nut assembly comprising a threaded screw, a threaded sectorially split nut with conical outer surface, a housing for said screw and said threaded nut with conical interior surface, an annular spring support for flat springs attached to each sector, an annular disc spring capable of assuming two equilibrium positions, and an annular retaining plug the combination of common means for laterally engaging the inner radius of said disc spring with said nut to provide both lateral guidance and longitudinal positioning of said nut, common means for retaining said disc spring in said housing, for stopping excess longitudinal motion of said nut, and for guiding said screw, means for actuating said disc spring between said two equilibrium positions, and means for preventing said nut from rotating in said housing.

2. An improved expansion nut assembly as described in claim 2 so constructed and arranged that said conical interior surface of said housing mates with said conical outer surface of said nut when said nut has the proper thread clearance with said screw.

3. An improved expansion nut assembly as described in claim 1 so constructed and arranged that said inner radius of said disc spring contacts an entire sectorial circumference of said nut when said nut is in its expanded position.

4. An improved expansion nut assembly as described in claim 1 wherein said annular spring support is located exteriorly to said housing and so connected to said disc spring that longitudinal forces on said annular spring support cause said disc spring to change to said other equilibrium position.

5. An improved expansion nut assembly as described in claim 1 wherein the taper in said conical interior surface of said housing is large enough to ensure closing of said nut in the distance between said two equilibrium positions of said disc spring.

6. An improved expansion nut assembly as described in claim 1 wherein the location of said disc spring with respect to said nut is on the opposite side from said annular spring support, and the relative diameter of said disc spring compared to said nut is slightly larger than the diameter of said nut in its expanded position.

References Cited in the file of this patent
UNITED STATES PATENTS

| | | |
|---|---|---|
| 2,367,480 | Beswick | Jan. 16, 1945 |
| 2,399,886 | Odevseff | May 7, 1946 |